US010541890B1

(12) United States Patent
Chen et al.

(10) Patent No.: US 10,541,890 B1
(45) Date of Patent: Jan. 21, 2020

(54) WINDOWED APPROACH TO ANALYTICS PROCESSING

(71) Applicant: Amazon Technologies, Inc., Seattle, WA (US)

(72) Inventors: Rui Chen, Bellevue, WA (US); Geoffrey Ryan Dworkin, Tucson, AZ (US); Douglas R. Hains, Seattle, WA (US); Brent Russell Smith, Redmond, WA (US); Serguei B. Stepaniants, Redmond, WA (US); Sen Zhao, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 394 days.

(21) Appl. No.: 15/386,388

(22) Filed: Dec. 21, 2016

(51) Int. Cl.
*H04L 12/26* (2006.01)
*H04L 29/08* (2006.01)
*G06F 16/23* (2019.01)

(52) U.S. Cl.
CPC .......... *H04L 43/04* (2013.01); *G06F 16/2379* (2019.01); *H04L 67/22* (2013.01); *H04L 67/306* (2013.01)

(58) Field of Classification Search
CPC ......... H04L 67/22; H04L 43/16; H04L 67/02; H04L 43/045; H04L 43/14; H04L 51/046; H04L 67/306; H04L 41/147; H04L 43/062; H04L 43/065; H04L 43/08; H04L 63/102; H04L 41/0681; H04L 41/0853; H04L 43/06; G06F 16/9535; G06F 16/285; G06F 11/3438; G06F 16/248; G06F 16/288; G06F 16/951; G06F 21/552; G06F 2201/86; G06F 2201/875; G06F 16/284; G06F 16/90335; G06F 16/95; G06F 17/2288; G06Q 30/0601; G06Q 50/01; G06Q 30/0224; G06Q 30/0255; G06Q 30/0256; G06Q 30/0269; G06Q 30/0261; G06Q 30/0263; G06Q 20/401; G06Q 30/0235
See application file for complete search history.

(56) References Cited

U.S. PATENT DOCUMENTS

| 8,775,275 | B1 * | 7/2014 | Pope ................... G06Q 30/0641 705/14.49 |
| 9,607,325 | B1 * | 3/2017 | Sriram ............... G06Q 30/0282 |
| 9,942,118 | B1 * | 4/2018 | Muhammad ........ H04L 41/0813 |
| 9,965,526 | B1 * | 5/2018 | Chanda .................. G06Q 50/01 |

(Continued)

*Primary Examiner* — Hitesh Patel
(74) *Attorney, Agent, or Firm* — Kilpatrick Townsend & Stockton LLP

(57) ABSTRACT

Described herein is a system and method for processing analytics data in a windowed manner. In some embodiments, each user of a number of users is assigned to a group (e.g., a treatment group or a control group). The system may monitor each user to obtain metric data associated with each of the users over the course of an experiment. In some embodiments, the system may identify an indication of a trigger event with respect to each user. For example, the indication of the trigger event may comprise a time at which an event occurred for that user. The system may identify and compile data from the metric data for each of the users with respect to the trigger event. In some embodiments the metric data may be aggregated for each of the users with respect to a window or timespan positioned relative to the identified trigger event.

20 Claims, 7 Drawing Sheets

(56) References Cited

U.S. PATENT DOCUMENTS

2015/0082206 A1* 3/2015 Low .................. G06F 3/0481
715/760
2018/0091413 A1* 3/2018 Richards ............ H04L 12/4641

* cited by examiner

WINDOWED APPROACH TO ANALYTICS PROCESSING

BACKGROUND

As the use of virtual environments (e.g., electronic marketplaces) increases, operators of those virtual environments are becoming increasingly interested in the effect of even minor changes to those virtual environments. For example, as content in an environment is altered, operators often need to be made aware of the effect that the alteration has had on visitors to the virtual environment. Effects may be found via the use of experiments. However, frequent visitors tend to enter into experiments earlier and are, in turn, followed for a longer period of time with current approaches. As a consequence, results of current analyses can be seen as the weighted average of long-term cumulative effects of frequent visitors and the short-term cumulative treatment of infrequent visitors. In other words, there may exist some self-selection bias in current approaches, which impairs the interpretability of the conclusions.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described herein include a system and method for processing analytics data in a windowed manner. In some embodiments, each user of a number of users is assigned to a group (e.g., a treatment group or a control group). The system may monitor each user to obtain metric data associated with each of the users. In some embodiments, the system may identify an indication of a trigger event. For example, the indication of the trigger event may comprise a time at which an event occurred. The system may identify and compile data from the metric data for each of the users with respect to the trigger event. In some embodiments the metric data may be aggregated for each of the users with respect to a window or timespan positioned relative to the identified trigger event.

By way of illustration, a user may, via a user device, request a webpage from a service provider computer. Upon receiving the request, the service provider may determine a group to which the user belongs. In particular, the service provider may determine whether the user should be assigned to a control group or a treatment (e.g., test) group. In this illustrative example, the user device may be provided a different version of the webpage based upon the group the user is assigned to. Upon serving the appropriate webpage to the user device (e.g., the trigger event), the service provider may monitor activities associated with the user to obtain metric data for that user with respect to time. The user's metric data may be processed such that data occurring a particular amount of time after the trigger event may be aggregated with data collected from other users at times corresponding to the particular amount of time.

Figure 1:
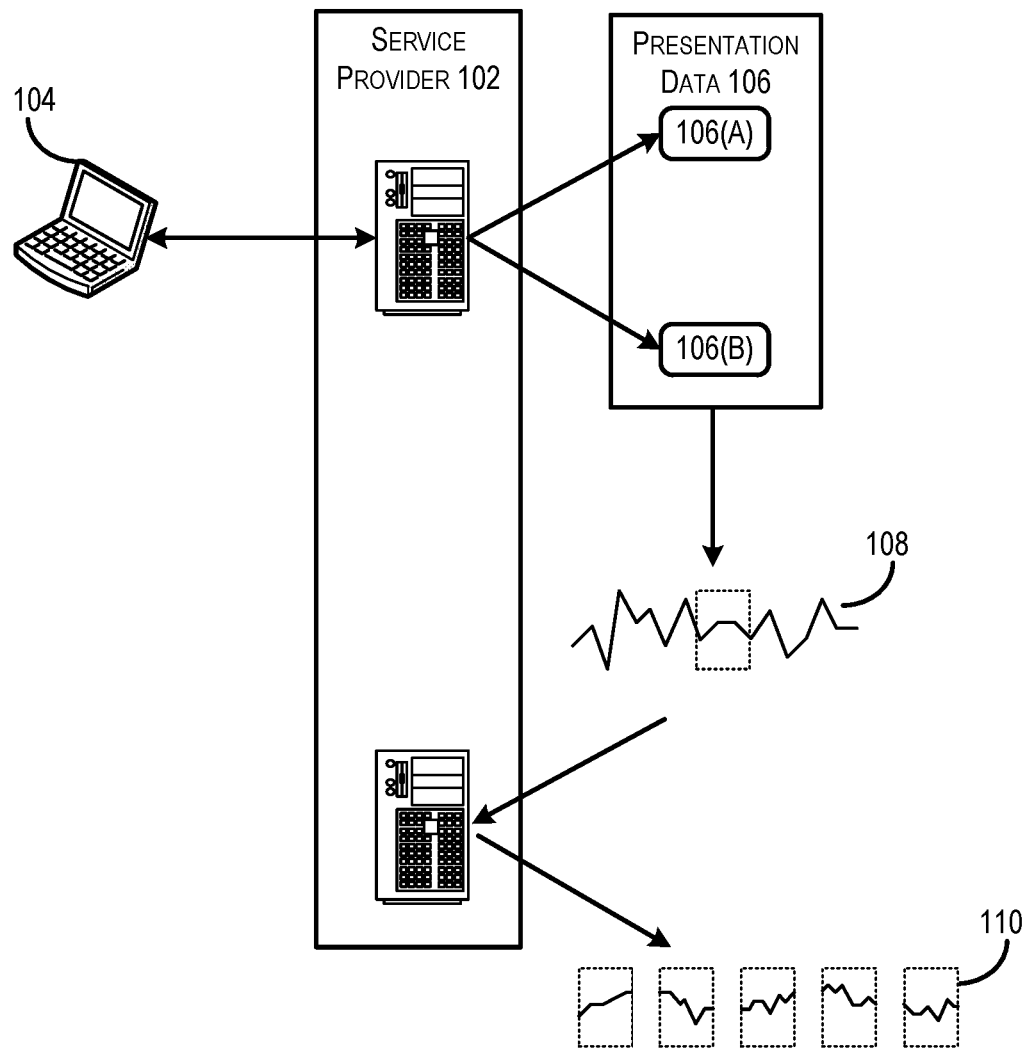
FIG. 1 depicts an illustrative example of a system in which analytics data may be processed using a windowed approach.

FIG. 1 depicts an illustrative example of a system in which analytics data may be processed using a windowed approach. In FIG. 1, a service provider 102 may be in communication with one or more client devices 104. The service provider 102 may be configured to provide presentation data 106 to the client device 104. In some embodiments, the service provider 102 may randomly provide one of multiple presentation data 106(A) and 106(B) to the client device 104. A number of metric data 108 may be monitored with respect to the client device (or a user associated with the client device). The metric data 108 may be processed in accordance with embodiments of the disclosure in order to generate a series of longitudinal data 110.

In some embodiments, presentation data 106 may comprise different versions of data (e.g., different network documents) to be presented to a client device 104. In some embodiments, the version of presentation data 106 to be presented to a particular client device 104 may be selected at random. For example, upon the client device 104 requesting access to a network document, the service provider may randomly select one of two versions of the network document to be provided to the client device 104. In some embodiments, this may comprise A/B testing implemented by the service provider 102. In some embodiments, each client device associated with the same account as client device 104 may be presented the same version of the network document each time that one of those client devices attempts to access a website. In this way, metric data 108 may be collected in association with a particular user account and/or user with respect to time.

Metric data 108 may comprise metrics related to any suitable factor that may be monitored with respect to a particular user, account, and/or client device 104. In some embodiments, the metric data 108 may be related to item consumption for one or more items in an electronic catalog maintained by the service provider 102. Item consumption data may be data that pertains to a consumption event that occurs in relation to a user and one or more items. For example, item consumption data may comprise purchase data for one or more items, website visitor data for a website for the item, or any other suitable item-related information. By way of illustration, metric data 108 may comprise information on purchases completed after presentation of the presentation data 106.

The longitudinal data 110 may comprise data compiled with respect to a particular window (e.g., a timeframe relative to a trigger event) and a number of metric data 108. In some embodiments, the longitudinal data 110 may be generated by identifying a trigger event in metric data 108, determining values for data within a particular window of the metric data 108, and adding those values to values already associated with that window in the longitudinal data 110. In some embodiments, the longitudinal data 110 may comprise data compiled from a number of different client devices 104/users relative to the trigger event.

For simplicity of illustration, a certain number of components are shown in FIG. 1. It is understood, however, that embodiments of the invention may include more than one of each component. In addition, some embodiments of the invention may include fewer than or greater than all of the components shown in FIG. 1. In addition, the components in FIG. 1 may communicate via any suitable communication medium (including the internet), using any suitable communication protocol.

Figure 2:
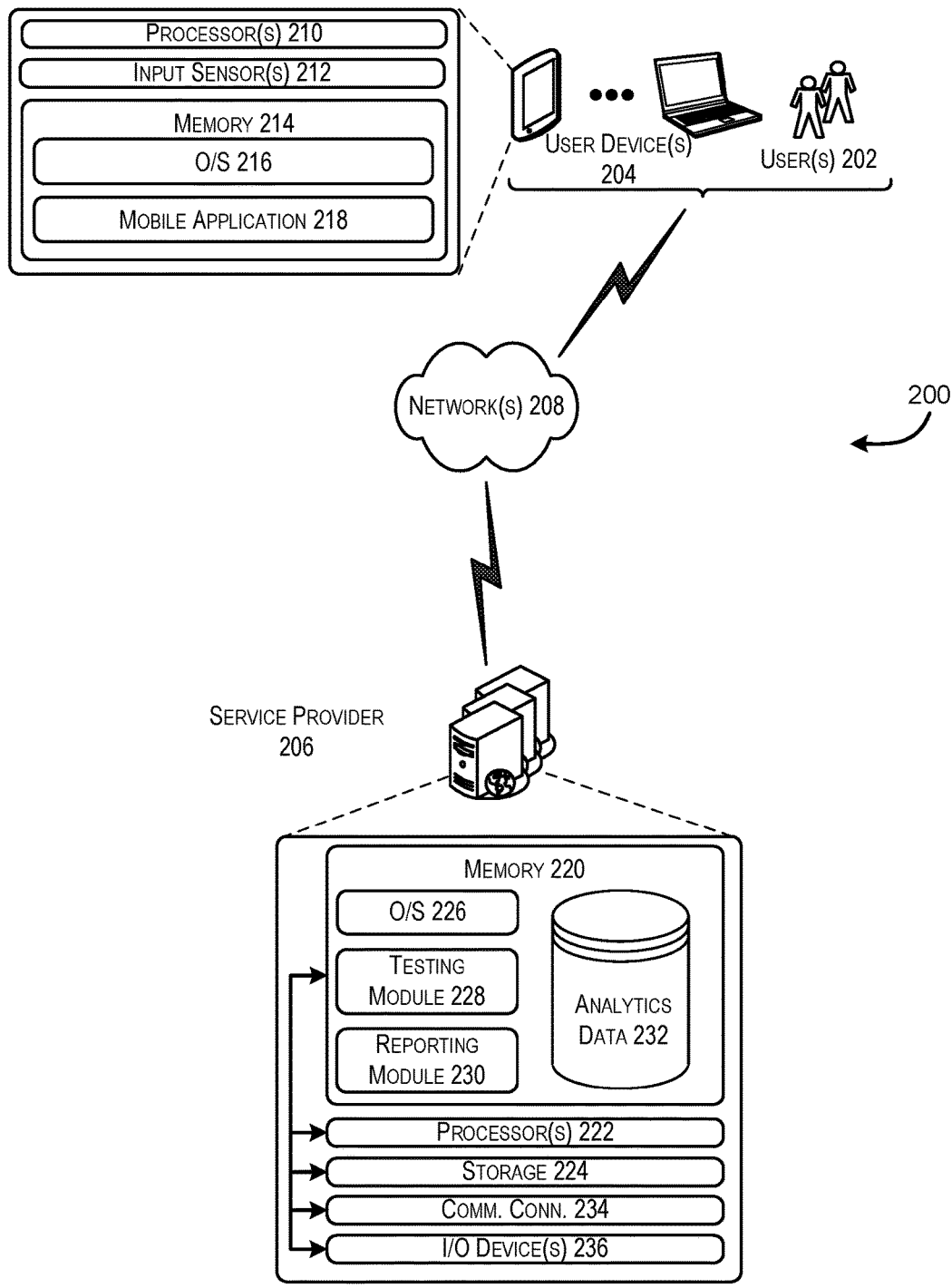
FIG. 2 depicts an illustrative example of a system or architecture in which techniques for processing analytic data in a longitudinal manner may be implemented.

FIG. 2 depicts an illustrative example of a system or architecture 200 in which techniques for processing analytic data in a longitudinal manner may be implemented. In architecture 200, one or more consumers and/or users 202 may utilize user devices 204. In some examples, the user devices 204 may be in communication with a service provider 206 via the network(s) 208, or via other network connections.

The user devices 204 may be any type of computing device such as, but not limited to, a mobile phone, a smart phone, a personal digital assistant (PDA), a laptop computer, a desktop computer, a server computer, a thin-client device, a tablet PC, etc. Additionally, user devices 204 may be any type of wearable technology device, such as a watch, earpiece, glasses, etc. The user device 204 may include one or more processors 210 capable of processing user input. The user device 204 may also include one or more input sensors 212 for receiving user input. As is known in the art, there are a variety of input sensors 212 capable of detecting user input, such as accelerometers, cameras, microphones, etc. The user input obtained by the input sensors may be from a variety of data input types, including, but not limited to, audio data, visual data, or biometric data. Embodiments of the application on the user device 204 may be stored and executed from its memory 214.

Turning to the contents of the memory 214 in more detail, the memory 214 may include an operating system 216. The memory 214 may also include a mobile application 218 capable of enabling interaction with the service provider 206. In some embodiments, the mobile application 218 may be configured to enable communication between the user device 204 and the service provider 206. In some embodiments, the service provider 206 may comprise a backend server that provides support (e.g., processing capabilities) for the mobile application 218. In some embodiments, the mobile application 218 may be an application maintained by an electronic retailer that enables a user to purchase, or otherwise interact with, items available from an electronic catalog. In some embodiments, the mobile application 218 may be a browser application capable of retrieving and displaying network document information.

In some examples, the network(s) 208 may include any one or a combination of many different types of networks, such as cable networks, the Internet, wireless networks, cellular networks, and other private and/or public networks. While the illustrated example represents the users 202 accessing the service provider 206 via browser application 216 over the network(s) 208, the described techniques may equally apply in instances where the users 202 interact with a service provider 206 via the user device 204 over a landline phone, via a kiosk, or in any other manner. It is also noted that the described techniques may apply in other client/server arrangements (e.g., set-top boxes, etc.), as well as in non-client/server arrangements (e.g., locally stored applications, peer to-peer systems, etc.).

As described briefly above, the browser application 216 may allow the users 202 to interact with a service provider 206, such as to store, access, and/or manage data, develop and/or deploy computer applications, and/or interact with web content. The one or more service providers 206, perhaps arranged in a cluster of servers or as a server farm, may be configured to host a website (or combination of websites) viewable via the user device 204 or a web browser accessible by a user device 204 via the browser application 216. Although depicted in memory of the user device 204 in this example, in some embodiments the browser application 216 may be hosted at a server. For example, the user device 204 may be a thin client device capable of accessing a browser application 216 remotely. The browser application 216 may be capable of handling requests from many users 202 and serving, in response, various user interfaces that can be rendered at the user device 204 such as, but not limited to, a web site. The browser application 216 may be any type of application or interface that supports user interaction with a website, including those with user interaction, such as social networking sites, electronic retailers, informational sites, blog sites, search engine sites, news and entertainment sites, and so forth. As discussed above, the described techniques can similarly be implemented outside of the browser application 216, such as with other applications running on the user device 204.

The service provider 206 may be any type of computing device such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the service provider 206 may be executed by one more virtual machines implemented in a hosted computing environment. The hosted computing environment may include one or more rapidly provisioned and released computing resources, which computing resources may include computing, networking, and/or storage devices. A hosted computing environment may also be referred to as a cloud-computing environment.

In one illustrative configuration, the service provider 206 may include at least one memory 220 and one or more processing units (or processor(s)) 222. The processor(s) 222 may be implemented as appropriate in hardware, computer-executable instructions, firmware or combinations thereof. Computer-executable instruction or firmware implementations of the processor(s) 222 may include computer-executable or machine executable instructions written in any suitable programming language to perform the various functions described.

The memory 220 may store program instructions that are loadable and executable on the processor(s) 222, as well as data generated during the execution of these programs. Depending on the configuration and type of service provider 206, the memory 220 may be volatile (such as random access memory (RAM)) and/or non-volatile (such as read-only memory (ROM), flash memory, etc.). The service provider 206 may also include additional storage 224, such as either removable storage or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 220 may include multiple different types of memory, such as static random access memory (SRAM), dynamic random access memory (DRAM) or ROM. Turning to the contents of the memory 220 in more detail, the memory 220 may include an operating system 226 and one or more application programs or services for implementing the features disclosed herein including at least a module for assigning clients to an appropriate group (testing module 228) and/or a module for processing metric data for a plurality of users into longitudinal data (reporting module 230). The memory 220 may also include analytics data 232, which stores information related to account transactions. In some embodiments, the analytics data 232 may be stored in a database.

The memory 220 and the additional storage 224, both removable and non-removable, are examples of computer-readable storage media. For example, computer-readable storage media may include volatile or non-volatile, removable or non-removable media implemented in any method or technology for storage of information such as computer-readable instructions, data structures, program modules or other data. As used herein, modules may refer to programming modules executed by computing systems (e.g., processors) that are part of the user device 204 or the service provider 206. The service provider 206 may also contain communications connection(s) 234 that allow the service provider 206 to communicate with a stored database, another computing device or server, user terminals, and/or other devices on the network(s) 208. The service provider 206 may also include input/output (I/O) device(s) and/or ports 236, such as for enabling connection with a keyboard, a mouse, a pen, a voice input device, a touch input device, a display, speakers, a printer, etc.

Turning to the contents of the memory 220 in more detail, the memory 220 may include an operating system 226, a database containing analytics data 232 and the one or more application programs or services for implementing the features disclosed herein, including a testing module 228 and/or reporting module 230.

In some embodiments, the testing module 228 may be configured to receive data from the mobile application 218 and assign an user associated with the mobile application 218 and/or user device 204 to a group. For example, the testing module 228 may be configured to assign any currently unassigned user to either a treatment group or a control group such that content provided to user devices associated with that user reflect either current production content or test content. In some embodiments, the testing module 228 may assign users to one group or another randomly. For example, upon receiving a communication from a mobile application 218, there may be a 50% chance that a user associated with the mobile application 218 will be assigned to a treatment group and a 50% chance that an user associated with the mobile application 218 will be assigned to a control group. Upon assigning each user to a group, the testing module 228 may be configured to provide appropriate content to the mobile application 218 based on the assigned group.

In some embodiments, the reporting module 230 may be configured to process metric data collected with respect to various user devices 204 and/or mobile applications 218 and compartmentalize that metric data with respect to particular windows. In some embodiments, the reporting module 230 may be configured to update data for each window as new data pertinent to that window is obtained. This process will be described in greater detail below.

Figure 3:
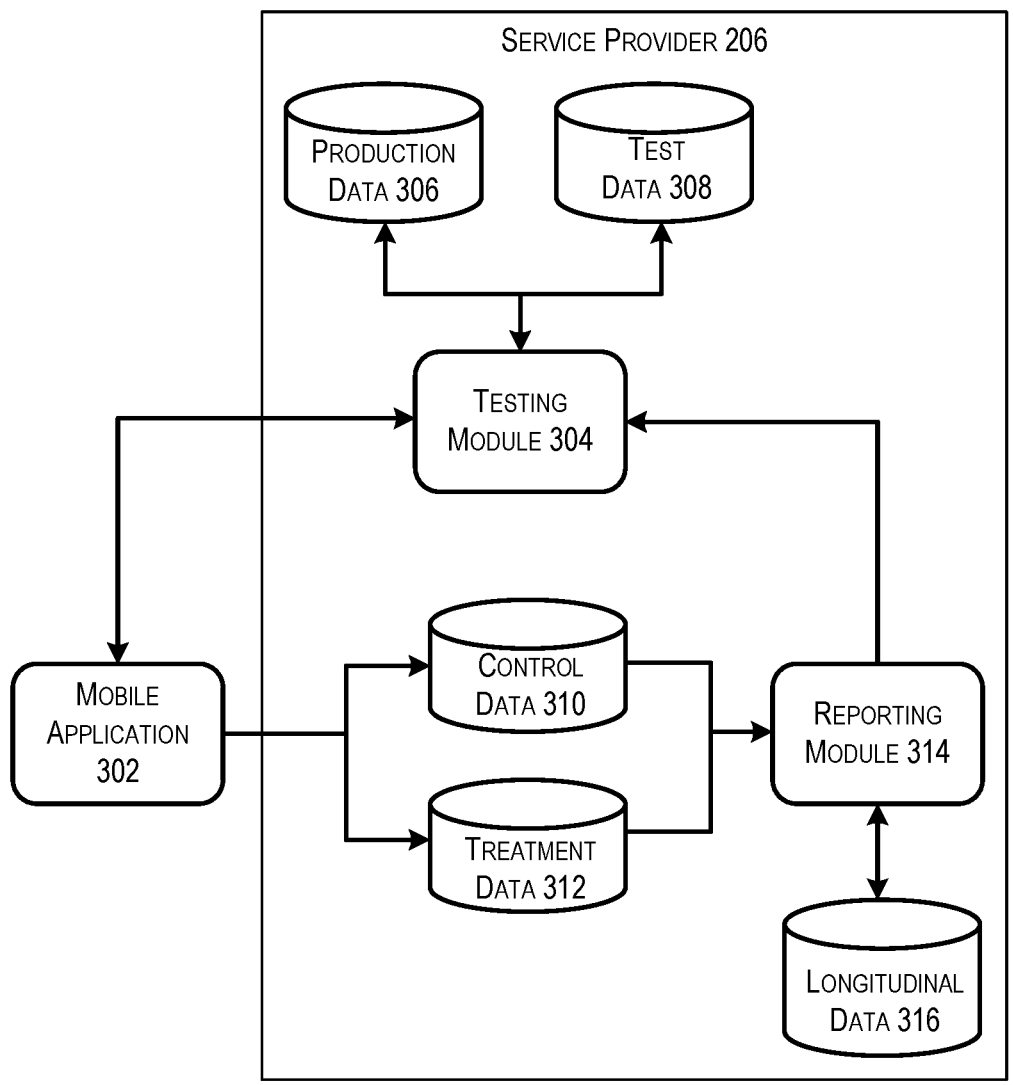
FIG. 3 depicts a process flow for generating longitudinal data that may be implemented in accordance with embodiments of the disclosure.

FIG. 3 depicts a process flow for generating longitudinal data that may be implemented in accordance with embodiments of the disclosure. In particular, FIG. 3 depicts a number of interactions between various components of system architecture 200 described above with respect to FIG. 2. In some embodiments, various processes described with respect to FIG. 3 may be performed by a service provider 206, which may be an example service provider 206 of FIG. 2.

In FIG. 3, a mobile application 302, which may be installed upon and executed from a user device, may request access to a resource maintained by a service provider. In some embodiments, the service provider may be an electronic marketplace and the mobile application 302 may request access to a webpage maintained by the electronic marketplace.

The service provider, upon receiving the request for access may, via a testing module 304, select a group in which an user associated with the mobile application 302 is to be placed. For example, the testing module 304 may assign the user to a treatment group or a control group. The selection/assignment of a user to a particular group may be random. Once the user associated with the mobile application has been assigned, the service provider may select content to provide to the mobile application 302. In some embodiments, the content may be selected from either a production data 306 or a test data 308. For example, upon receiving a request for a webpage, the testing module 304 may elect to provide a first version of the webpage that is currently in production from production data 306, or the testing module 304 may elect to provide a second version of the webpage that is to be tested. In some embodiments, production data 306 may comprise data intended for consumption by users within a control group whereas test data 308 may comprise data intended for consumption by users within a treatment group.

Once an user associated with the mobile application 302 has been assigned to a group and/or the mobile application 302 has been provided with the requested content, the user associated with the mobile application 302 may be monitored to obtain various metric data associated with that user. The metric data may comprise purchase data, webpage viewing data, or any other suitable data. In some embodiments, the metric data may be stored with an indication of the group to which the user has been assigned. For example, the metric data may be stored in control data 310 if the user is associated with a control group and the metric data may be stored in treatment data 312 if the user is associated with a treatment group.

The metric data obtained with respect to an user may be processed by a reporting module 314. The reporting module 314 may be configured to process metric data from control data 310 and treatment data 312. In some embodiments, the reporting module 314 may identify a trigger event within the obtained metric data. For example, the metric data may be obtained with respect to time (e.g., via a graph or timeline). In this example, the service provider 206 may store an indication of a trigger event with respect to each user. By way of illustration, upon receiving a request for a particular webpage, the service provider may provide either the production (control) version of the webpage or a test (treatment) version of the webpage. In this illustration, the serving of either version of the requested webpage to the mobile application 302 may constitute a trigger event. The reporting module 314 may be configured to generate a series of windows with respect to the trigger event, each of which comprises a horizon (i.e., a time from the trigger event) and a span (a length of time for the window). The reporting module 314 may compile metric data obtained from a number of users in a longitudinal manner. For example, the reporting module 314 may generate data for a single window in a series of windows by compiling data from corresponding windows (i.e., windows sharing the same horizon) across user accounts. In some embodiments, individual windows may be updated dynamically. For example, as metric data is obtained for a user with respect to a particular window, data stored in relation to that window may be updated. In some embodiments, the reporting module 314 may provide feedback to the testing module 304.

Data pertaining to one or more windows may be stored by the service provider 206 within longitudinal data 316. In some embodiments, the service provider may analyze particular windows within the longitudinal data 316 to identify patterns and/or trends. For example, if a window associated with a first horizon indicates an increase in sales of an item and a subsequent window associated with a second horizon indicates a decrease in sales of that same item, then the service provider may determine that although there may be an initial increase in sales, that increase may represent at least a partial cannibalization of future sales.

Figure 4:
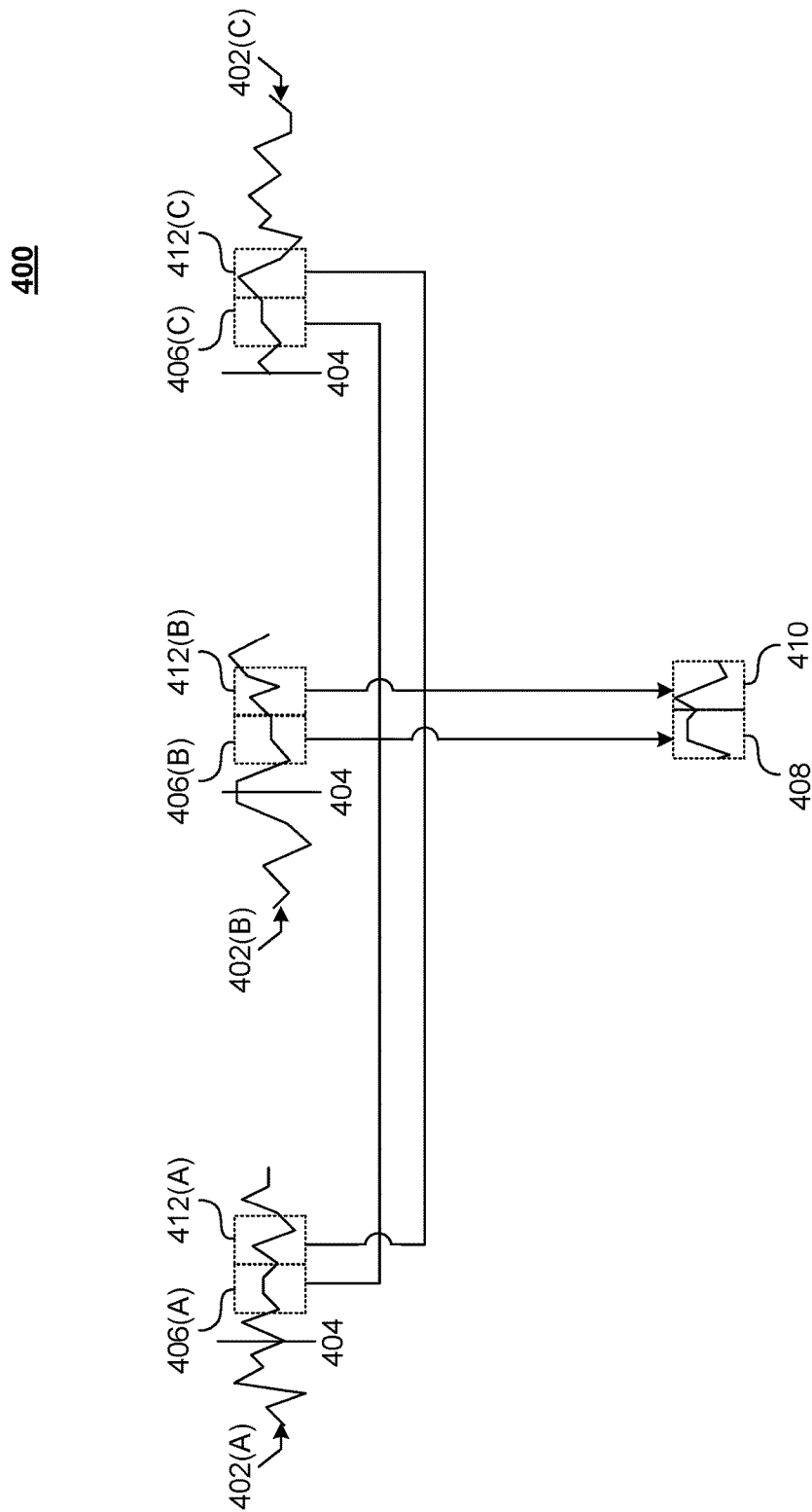
FIG. 4 depicts an illustrative example of a process for partitioning data into a series of windows in accordance with embodiments of the disclosure.

FIG. 4 depicts an illustrative example of a process for partitioning data into a series of windows in accordance with embodiments of the disclosure. In FIG. 4, multiple sets of metric data 402(A-C) may be obtained with respect to a number of users. The metric data 402 (A-C) may each be associated with a different user and/or user account. For example, metric data 402 (A) may be collected with respect to a first user, metric data 402 (B) may be collected with respect to a second user, and metric data 402 (C) may be collected with respect to a third user. In some embodiments, each set of metric data may pertain to actions performed by a user associated with the account over time. For example, the metric data may pertain to transactions conducted by the user, websites visited by the user, or any other suitable actions taken by the user.

Some or all of the process 400 (or any other processes described herein, or variations and/or combinations thereof) may be performed under the control of one or more computer systems configured with executable instructions and may be implemented as code (e.g., executable instructions, one or more computer programs or one or more applications). In accordance with at least one embodiment, the process 400 of FIG. 4 may be performed by at least the one or more service providers 206 shown in FIG. 2. The code may be stored on a computer-readable storage medium, for example, in the form of a computer program including a plurality of instructions executable by one or more processors. The computer-readable storage medium may be non-transitory.

In some embodiments, each of the sets of metric data 402(A-C) may include an indication of a trigger event 404. A trigger event 404 may comprise any event correlated to an initiation of an experiment. For example, upon receiving a request, a trigger event may comprise an indication of the time at which the request is fulfilled. For example, if the request is a request for a webpage, then the trigger event may comprise a time at which the webpage is served.

To compile longitudinal data, a service provider may identify a first window 406(A-C) in each of the metric data 402(A-C) that corresponds to a longitudinal data window 408. Data values within each of the first window 406 (A-C) may be compiled to generate values for the window 408. In some embodiments, window 408 may be updated each time that a new corresponding window 406 is detected within a set of metric data 402 to include the data from that detected window 408.

The process 400 may be repeated for a number of longitudinal windows. For example, a second longitudinal window 410 may be updated based on data within a corresponding window 412 (A-C) in each of the metric data 402. In some embodiments, there may be a limited number of longitudinal windows in a particular experiment. For example, an experiment may be associated with a specified runtime or length of time. In this example, the number of windows in the experiment may be determined based on the length of time for the experiment and a span of each of the windows in the experiment. A span associated with each window may vary based on a type or category of the experiment.

Figure 5:
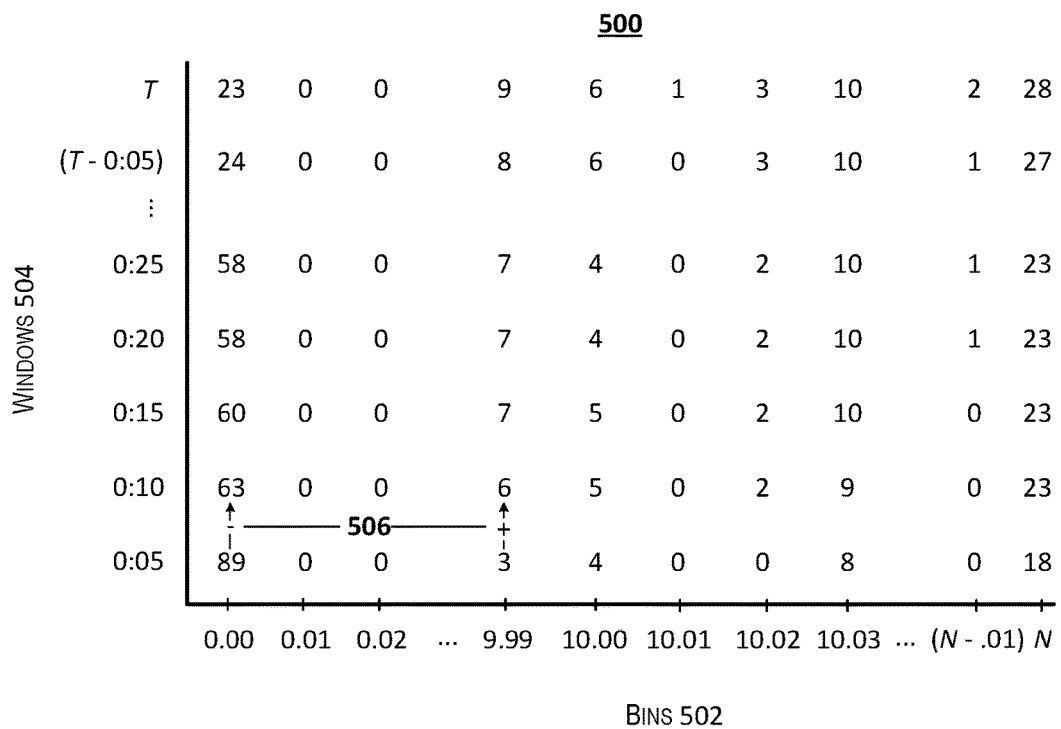
FIG. 5 depicts an illustrative example of longitudinal data that may be implemented in accordance with embodiments of the disclosure.

FIG. 5 depicts an illustrative example of longitudinal data that may be implemented in accordance with embodiments of the disclosure. In FIG. 5, the longitudinal data 502 is depicted as an array of values. In some embodiments, the longitudinal data 502 may comprise a histogram (i.e., a graphical representation of a distribution of numerical data) that includes a number of bins 502 and windows 504. In some embodiments, separate longitudinal data 502 may be maintained for each group in a set of groups. For example, a first set of longitudinal data may be stored in relation to a control group and a second set of longitudinal data may be stored in relation to a treatment group.

Data associated with each user may be stored in bins 502. An entire range of values (e.g., 0-1V) may be divided into a series of bins (e.g., intervals) and a number of data values that belong in each bin may be stored in that bin. For example, in a scenario in which bins represent a currency amount (e.g., a dollar amount), the bins may contain data on the number of users that have spent that currency amount. The granularity of the bins may be adjusted based on a level of detail required. For example, in the scenario in which the bins each represent an amount of currency, the bins may represent the currency in the smallest possible interval (e.g., one cent intervals). In another example, the bins may represent five cent intervals, where the currency spent by each user is rounded up or down to the nearest five cents. In some embodiments, the interval width of each bin may vary. For example, for low and high values the bin interval may comprise 10 cent intervals whereas values closer to the middle (e.g., average values) may comprise one cent intervals. In some embodiments, the maximum value in the range of values may be predetermined. In some embodiments, values may be winsorized (i.e., if the value exceeds a maximum/minimum value, then the value is set to the maximum/minimum value). For example, if the maximum value associated with a bin is N, then any user associated with a value that exceeds N would be added to the bin associated with N.

The longitudinal data 502 may be stored with respect to time in a series of windows 504. Each window may represent a time period from the occurrence of a trigger event having a horizon and span. For example, each window may have a span of five seconds and a horizon set so that it begins when the previous window ends (i.e., at 0:05, 0:10, 0:15, etc.) so there is no overlap. In some embodiments, the span of each window may vary based on its horizon. For example, a window's span may increase as the horizon increases. In some embodiments, the number of windows in longitudinal data 502 may be determined based on the span of the windows and a total length of time T to be measured.

As events are detected, the longitudinal data 502 may be dynamically updated. In some embodiments, an event may lead to a first bin being decremented and a second bin being incremented as depicted at 506. For example, the system may determine, from a corresponding window within metric data associated with a user account, that the user has made a purchase. In this example, the system may identify a first bin with which the user account was associated in the previous window. The system may then identify a second bin with which the user account should be associated in the current window. In this example, for the current window the first bin may be decremented by one (to represent removing the user account from that bin) and the second bin may be incremented by one (to represent the addition of the user account to that bin).

The longitudinal data 502 may be used to calculate outlier users for an experiment very quickly. In some embodiments, data to be used in an experiment may be winsorized such that it is capped at a maximum/minimum value. The maximum/minimum value in these scenarios may comprise a value associated with a percentile. For example, upon selecting to winsorize values at a $99^{th}$ percentile, the system may calculate a data value for which 99 percent of the population of user accounts falls below. It should be recognized that as the experiment runs, this value may change. Outliers (e.g., those users associated with values over the maximum or under the minimum) may be winsorized such that they are associated with the calculated maximum or minimum value.

In some embodiments, the system may determine whether a mean of two separate longitudinal data sets are statistically different from one another. For example, the system may utilize a T-test to determine if corresponding windows in each of the longitudinal data sets (e.g., a control longitudinal data and a treatment longitudinal data) are different. In this example, the T-Test may be used to calculate a difference between the data sets. In some embodiments, the system may maintain a current variance, sum of squares, winsorization maximum/minimum, or any other suitable value. These values may be used dynamically by the system as they are updated.

Figure 6:
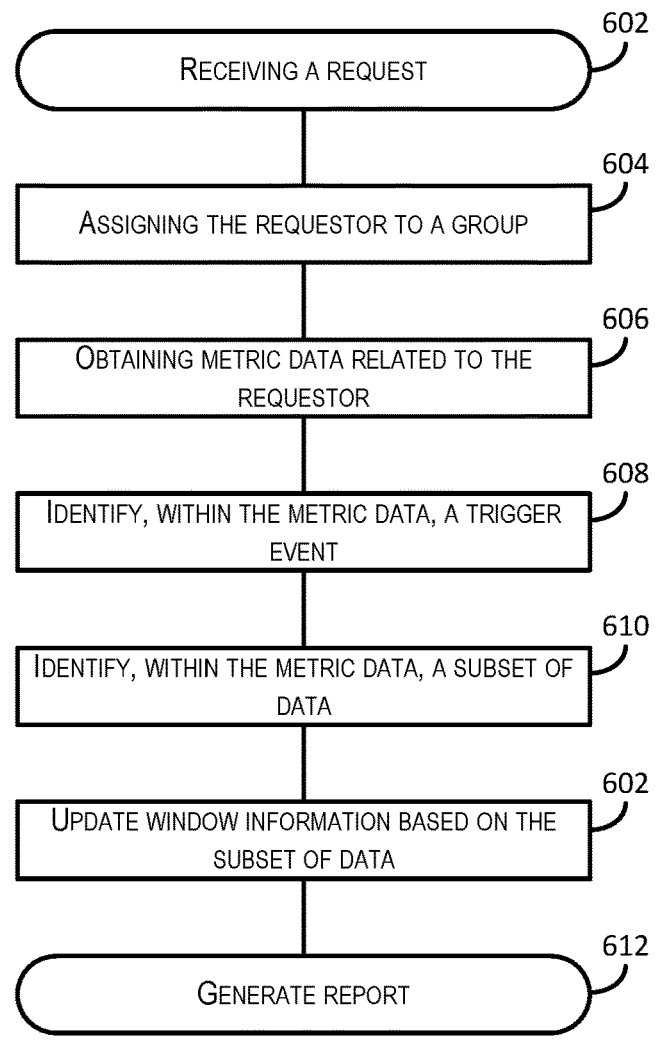
FIG. 6 depicts an illustrative flow diagram demonstrating an example system for processing data using a windowed approach in accordance with at least some embodiments.

FIG. 6 depicts an illustrative flow diagram demonstrating an example system for processing data using a windowed approach in accordance with at least some embodiments. The process 600 is illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement this process and any other processes described herein.

Process 600 may begin at 602, when a request is received by the service provider. In some embodiments, the request may comprise a request for access to a resource maintained by the service provider. For example, the request may include a request for a webpage. In some embodiments, similar requests may be received from a number of users.

At 604, the requestor may be assigned to a group. For example, upon receiving a request from a particular user, the service provider may, upon determining that the user has not already been assigned to a group, assign the user to a group comprising either a treatment group or a control group. Based on the group assigned, the user may be provided with a different version of the requested resource based on the experiment.

At 606, the service provider may collect metrics related to the user. In some embodiments, the service provider may monitor user activity in order to generate metric data for the user. In some embodiments, this may comprise analyzing click-through data associated with a user or user account. In some embodiments, the metric data may be collected from a user device. In some embodiments, the metric data may be collected from a server with which a user device is in communication. In some embodiments, the metric data may be collected from a combination of user devices and one or more servers.

At 608, the service provider may identify an indication of a trigger event within the metric data. In some embodiments, this may be a time at which an event occurred. For example, a trigger event may comprise the time at which an experiment began.

At 610, the service provider may identify a subset of the metric data relevant to In some embodiments, the service provider may identify metric data occurring within a window some amount of time after the occurrence of the trigger event. For example, metric data for a plurality of users that occurs five seconds after a trigger event may be aggregated into a single data point. In this example, it should be noted that trigger events for each user in the multiple users may vary based on that user's actions. Accordingly, although the metric data obtained from each user may correspond to a relative location with respect to the trigger event, each of the obtained data may have occurred at different times. In this way, metric data associated with various users is aligned based on the amount of time that has elapsed since the trigger event.

At 612, the service provider may generate a report. In some embodiments, the service provider may use one or more machine learning techniques to identify patterns between various windows. In some embodiments, the service provider may identify variances in expected values for particular windows.

Embodiments of the disclosure provide for a number of technical advantages. For example, the system allows for more accurate assessment of statistical analysis in experimental data. For example, by segmenting data in this fashion and aligning metric data from user accounts based on a corresponding time from trigger, the system is able to detect cannibalization (i.e., an increase at a first time at the expense of a decrease at another time). This is typically very difficult to detect in a system which data is siloed. Additionally, the use of the array described in the disclosure (e.g., as depicted in FIG. 5) enables the system to quickly calculate percentile data and account for outliers without re-counting and re-calculating the entire data set each time. This significantly reduces the amount of processing power needed and represents a significant improvement over the current systems.

Figure 7:
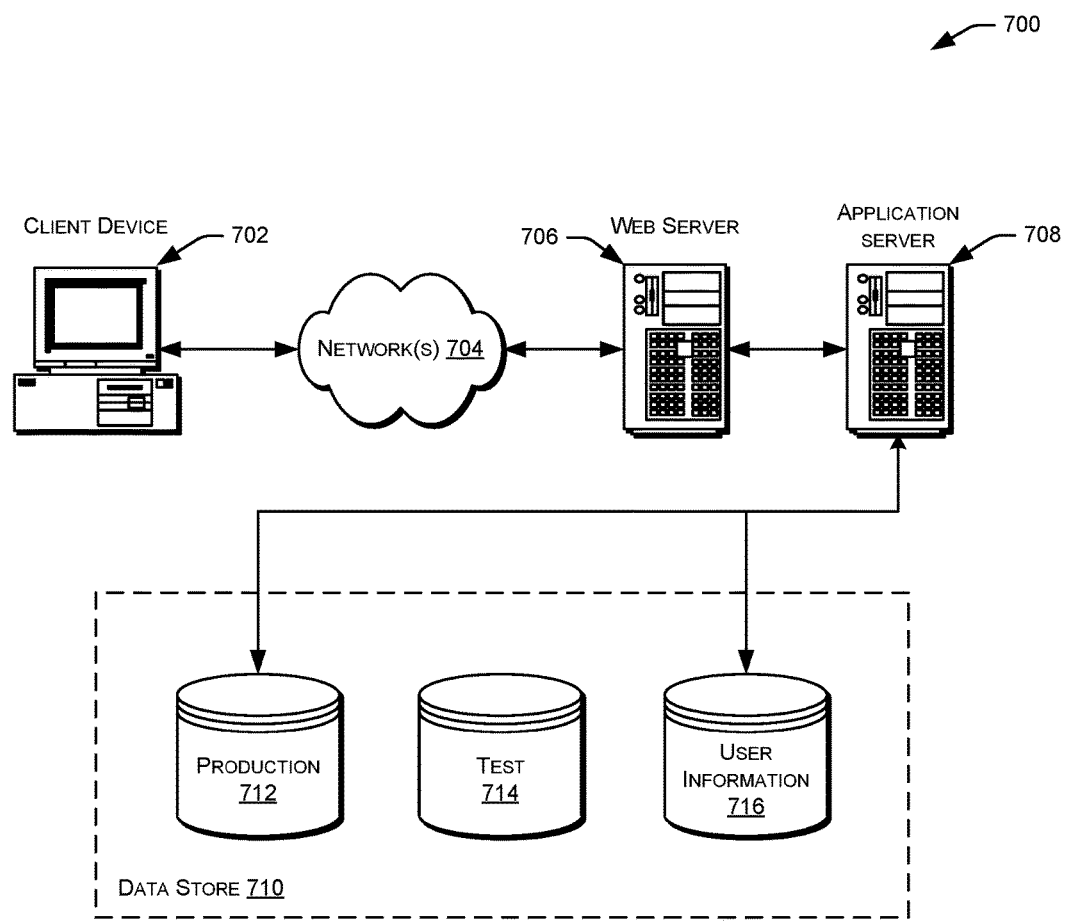
FIG. 7 illustrates an environment in which various embodiments can be implemented.

FIG. 7 illustrates aspects of an example environment 700 for implementing aspects in accordance with various embodiments. As will be appreciated, although a Web-based environment is used for purposes of explanation, different environments may be used, as appropriate, to implement various embodiments. The environment includes an electronic client device 702, which can include any appropriate device operable to send and receive requests, messages or information over an appropriate network 704 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 706 for receiving requests and serving content in response thereto, although for other networks an alternative device serving a similar purpose could be used as would be apparent to one of ordinary skill in the art.

The illustrative environment includes at least one application server 708 and a data store 710. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio and/or video to be transferred to the user, which may be served to the user by the Web server in the form of HyperText Markup Language ("HTML"), Extensible Markup Language ("XML") or another appropriate structured language in this example. The handling of all requests and responses, as well as the delivery of content between the client device 702 and the application server 708, can be handled by the Web server. It should be understood that the Web and application servers are not required and are merely example components, as structured code discussed herein can be executed on any appropriate device or host machine as discussed elsewhere herein.

The data store 710 can include several separate data tables, databases or other data storage mechanisms and media for storing data relating to a particular aspect. For example, the data store illustrated includes mechanisms for storing production data 712 and user information 716, which can be used to serve content for the production side. The data store also is shown to include a mechanism for storing test data 714, which can be used for testing new content or other suitable experimental use. It should be understood that there can be many other aspects that may need to be stored in the data store, such as for page image information and to access right information, which can be stored in any of the above listed mechanisms as appropriate or in additional mechanisms in the data store 710. The data store 710 is operable, through logic associated therewith, to receive instructions from the application server 708 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 702. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 7. Thus, the depiction of the system 700 in FIG. 7 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
receiving requests in relation to a plurality of users;
prior to obtaining metric data related to the plurality of users, determining at least two groups of users for the plurality of users;
obtaining the metric data related to the plurality of users, the metric data derived from an interaction of each user of the plurality of users with a presentation of data on respective user devices;
identifying, within the metric data, an indication of an occurrence of a trigger event for each user of the plurality of users;
determining, for individual users of the plurality of users, a subset of the metric data positioned in a common longitudinal relation to the trigger event, wherein the common longitudinal relation is represented within a longitudinal-oriented window that is associated with the plurality of users, the longitudinal-oriented window representing a time period from the occurrence of the trigger event and including one or more values, the one or more values being associated with subsequent events that follow the trigger event within the time period;
compiling data from each subset of the metric data for the plurality of users;
updating the one or more values within the longitudinal-oriented window to reflect the compiled data based on the determined group; and
determining, based on the one or more values within the longitudinal-oriented window, a difference between the at least two groups, the determined difference between the at least two groups being used to improve a particular interaction of a user of the plurality of users with respect to a particular presentation of data on a user device of the user.

2. The computer-implemented method of claim 1, wherein the at least two groups comprises one of a control group or a treatment group.

3. The computer-implemented method of claim 1, wherein a group of the at least two groups is determined based on an experiment, the metric data being derived from the experiment, the method further comprising winsorizing the metric data in the longitudinal-oriented window and using the winsorized metric data to determine a presentation of data on a user device of a user of the plurality of users.

4. The computer-implemented method of claim 1, wherein determining a group for the plurality of users comprises randomly selecting the group from a number of available groups.

5. The computer-implemented method of claim 1, further comprising presenting a version of content to individual users of the plurality of users based on a group for that user.

6. A system comprising:
a processor; and
a memory including instructions that, when executed with the processor, cause the system to, at least:
receive requests in relation to a plurality of users;
prior to obtaining metric data related to the plurality of users, determine at least two groups of users for the plurality of users;
obtain the metric data related to the plurality of users, the metric data derived from an interaction of each user of the plurality of users with a presentation of data on respective user devices;
identify, within the metric data, an indication of an occurrence of a trigger event for each user of the plurality of users;
determine, for individual users of the plurality of users, a subset of the metric data positioned in a common longitudinal relation to the trigger event, wherein the common longitudinal relation is represented within a longitudinal-oriented window that is associated with the plurality of users, the longitudinal-oriented window representing a time period from the occurrence of the trigger event and including one or more values, the one or more values being associated with subsequent events that follow the trigger event within the time period;
compile data from each subset of the metric data for the plurality of users;
update the one or more values within the longitudinal-oriented window to reflect the compiled data based on the determined group; and
determine, based on the one or more values within the longitudinal-oriented window, a difference between the at least two groups, the determined difference between the at least two groups being used to improve a particular interaction of a user of the plurality of users with respect to a particular presentation of data on a user device of the user.

7. The system of claim 6, the memory further including instructions that, when executed with the processor, cause the system to winsorize the metric data in the longitudinal-oriented window and use the winsorized metric data to determine a presentation of data on a user device of a user of the plurality of users, wherein a group of the at least two groups is determined based on an experiment, the metric data being derived from the experiment.

8. The system of claim 6, wherein the longitudinal-oriented window is associated with a horizon and a span.

9. The system of claim 8, wherein the span is determined based on the requests.

10. The system of claim 6, wherein the metric data comprises data related to transactions conducted by the user.

11. The system of claim 6, wherein the metric data comprises data related to webpage viewing associated with the user.

12. The system of claim 6, wherein the trigger event comprises a time at which a resource is provided to the user device associated with the user.

13. The system of claim 12, wherein the resource is a webpage maintained by the system.

14. A non-transitory computer readable medium storing specific computer-executable instructions that, when executed by a processor, cause a computer system to at least:
receive requests in relation to a plurality of users;
prior to obtaining metric data related to the plurality of users, determine at least two groups of users for the plurality of users;
obtain the metric data related to the plurality of users, the metric data derived from an interaction of each user of the plurality of users with a presentation of data on respective user devices;

identify, within the metric data, an indication of an occurrence of a trigger event for each user of the plurality of users;

determine, for individual users of the plurality of users, a subset of the metric data positioned in a common longitudinal relation to the trigger event, wherein the common longitudinal relation is represented within a longitudinal-oriented window that is associated with the plurality of users, the longitudinal-oriented window representing a time period from the occurrence of the trigger event and including one or more values, the one or more values being associated with subsequent events that follow the trigger event within the time period;

compile data from each subset of the metric data for the plurality of users;

update the one or more values within the longitudinal-oriented window to reflect the compiled data based on the determined group; and determine, based on the one or more values within the longitudinal-oriented window, a difference between the at least two groups, the determined difference between the at least two groups being used to improve a particular interaction of a user of the plurality of users with respect to a particular presentation of data on a user device of the user.

15. The computer readable medium of claim 14, wherein a request of the requests is related to an item in an electronic catalog.

16. The computer readable medium of claim 15, wherein the metric data comprises data related to interactions between the user and the item.

17. The computer readable medium of claim 14, further comprising instructions that are executable by the processor for winsorizing the metric data in the longitudinal-oriented window and using the winsorized metric data to determine a presentation of data on a user device of a user of the plurality of users, and wherein a group of the at least two groups is determined based on an experiment, the metric data being derived from the experiment.

18. The computer readable medium of claim 14, wherein the trigger event occurs at a different time with respect to each of the plurality of users.

19. The computer readable medium of claim 14, wherein the one or more values are updated dynamically as metric data is obtained.

20. The computer readable medium of claim 14, wherein the trigger event comprises a time at which a resource is provided to the user device associated with the user.

* * * * *